United States Patent [19]
Davis

[11] Patent Number: 4,590,397
[45] Date of Patent: May 20, 1986

[54] TERMINAL BLOCK FOR DYNAMOELECTRIC MACHINE

[75] Inventor: Randall D. Davis, Rockford, Ill.

[73] Assignee: Sundstrand Corporation, Rockford, Ill.

[21] Appl. No.: 677,031

[22] Filed: Nov. 30, 1984

[51] Int. Cl.[4] ........................................... H02K 11/00
[52] U.S. Cl. ...................................... 310/71; 310/43; 310/45; 310/59; 310/89; 339/198 R
[58] Field of Search ...................... 310/71, 43, 45, 89, 310/254, 258, 58, 59, 52; 336/107, 192; 339/5 M, 198 R

[56] References Cited

U.S. PATENT DOCUMENTS

| | | |
|---|---|---|
| 1,403,185 | 1/1922 | Mix . |
| 1,512,693 | 10/1924 | Juillard . |
| 2,683,227 | 7/1954 | Beckwith ............................ 310/71 |
| 3,144,572 | 8/1964 | Smader . |
| 3,275,864 | 9/1966 | Fennell, Jr. |
| 3,391,379 | 7/1968 | Smotherman . |
| 3,675,058 | 7/1972 | Beddows et al. |
| 3,725,707 | 4/1973 | Leimbach et al. |
| 3,739,323 | 7/1973 | Spors . |
| 3,980,910 | 9/1976 | Steinebronn et al. |
| 3,984,712 | 10/1976 | Hill . |
| 4,004,169 | 1/1977 | Charlton . |
| 4,029,978 | 6/1977 | Jager ................................. 310/71 |
| 4,061,935 | 12/1977 | Kandpal . |
| 4,151,434 | 4/1979 | Zona et al. |
| 4,198,583 | 4/1980 | Anderson ............................ 310/71 |
| 4,250,419 | 2/1981 | Zolman . |
| 4,274,021 | 6/1981 | Kamiya et al. |
| 4,307,437 | 12/1981 | Severing . |
| 4,321,497 | 3/1982 | Long . |

FOREIGN PATENT DOCUMENTS

| | | | |
|---|---|---|---|
| 0056756 | 7/1982 | European Pat. Off. ............. | 310/71 |
| 0847033 | 8/1952 | Fed. Rep. of Germany ........ | 310/71 |
| 1613222 | 8/1970 | Fed. Rep. of Germany ........ | 310/71 |
| 2648824 | 4/1978 | Fed. Rep. of Germany ........ | 310/71 |
| 0037874 | 3/1980 | Japan .................................. | 310/71 |
| 0417876 | 7/1974 | U.S.S.R. ............................. | 310/71 |

Primary Examiner—R. Skudy
Attorney, Agent, or Firm—Wood, Dalton, Phillips, Mason & Rowe

[57] ABSTRACT

To eliminate difficulties in making a large number of external connections from solid wire windings in a dynamoelectric machine, a unique terminal block (54) is disposed within the machine housing 10. The machine includes a stator having a body (12) of magnetizable material and a plurality of groups of windings (14, 44, 46, 48), each winding being of solid wire. A rotor (18) is mounted for rotation relative to the stator and the housing (10) contains both the rotor (18) and the stator (12,14). A plurality of multi-terminal connectors (34) are mounted on the housing (10) and accessible from the exterior thereof and an elongated terminal block (54) is disposed within the housing (10) and is comprised of a stack of flat insulators (60-68) sandwiching electrically isolated bus bars 74 between adjacent ones of the insulators. Each bus bar (74) is associated with a winding group (44, 46, 48). Connections (78) at the exterior ends of the terminal block connect each of the bus bars (74) to a corresponding one of the winding groups (44, 46, 48) and a plurality of stranded wire conductors (92) extend from one side (96) of the terminal block to interconnect the bus bars (74) and the multi-terminal connectors (34).

8 Claims, 7 Drawing Figures

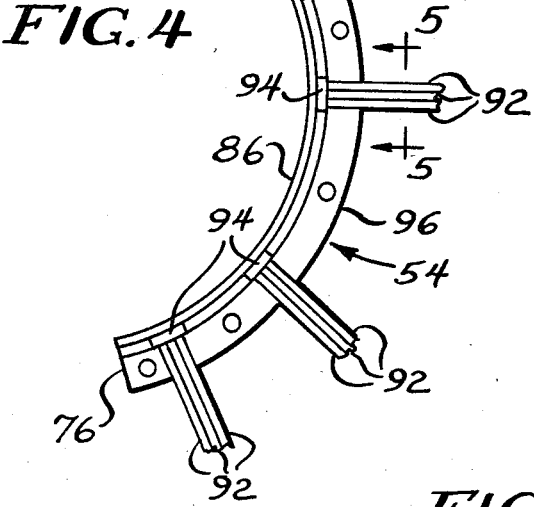
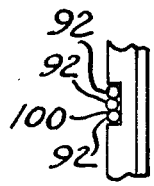
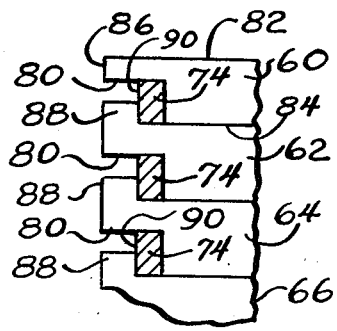
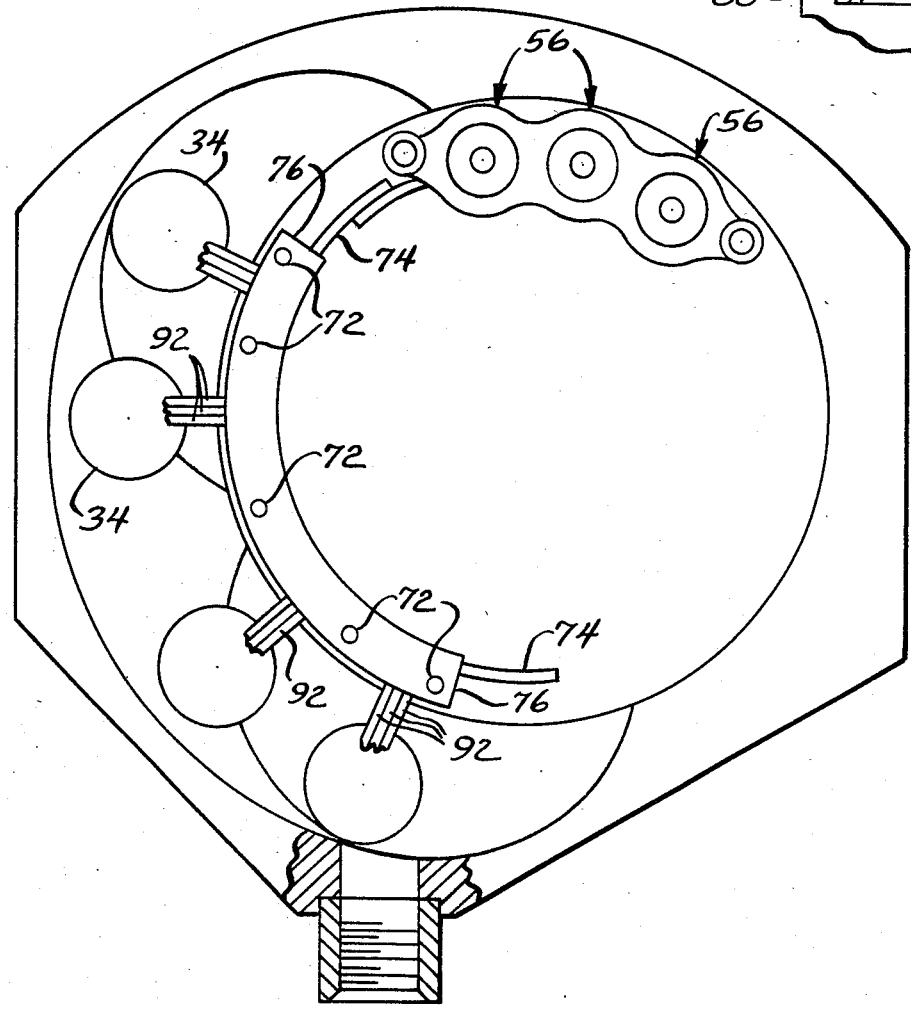

TERMINAL BLOCK FOR DYNAMOELECTRIC MACHINE

FIELD OF THE INVENTION

This invention relates to a terminal block for a dynamoelectric machine such as a generator, and more specifically, to a terminal block that may be employed internally of the machine for facilitating the connection of machine windings to externally accessible connectors.

BACKGROUND OF THE INVENTION

Many dynamoelectric machines, such as generators, utilize solid wire windings which can be quite stiff and difficult to bend as may be required to facilitate connections to an external circuit. The difficulty, of course, increases as the capacity of the machine increases because the cross section of solid wire used in the winding will commensurately increase to provide greater current carrying capacity.

This problem is not insurmountable where the external connections to be made are relatively few in number since the machine housing will usually have sufficient space so as to allow the conductors to be appropriately bent, connected to busses, connected to pins, etc. while still maintaining the required electrical isolation between the conductors. However, a real difficulty arises when a relatively large number of external connections are required and provision for making such connections, at least in part, must occur within the machine housing.

The present invention is directed to overcoming the above problem.

SUMMARY OF THE INVENTION

It is the principal object of the invention to provide a new and improved dynamoelectric machine including an internal terminal block to facilitate the provision, within the machine housing, of means for establishing a large number of external connections.

An exemplary embodiment of the invention achieves the foregoing object in a dynamoelectric machine including a stator having a body of magnetizable material and a plurality of groups of windings associated therewith, each winding being of solid wire. A rotor is mounted for rotation relative to the stator and a housing containing the rotor and the stator is provided. A plurality of multi-terminal connectors are mounted on the housing and are accessible from the exterior thereof. A terminal block is disposed within the housing and mounts a plurality of electrically isolated bus bars, one for each of the windings and means connect each of the bus bars to a corresponding one of the groups. A plurality of stranded wire conductors interconnect each of the bus bars at each of the multi-terminal connectors and are disposed within the housing.

In a highly preferred embodiment, the terminal block is formed of a stack of flat insulators which sandwich electrically isolated bus bars between adjacent insulators.

In the preferred embodiment, the dynamoelectric machine is a multi-phase generator and a bus is provided for each phase. The insulators are provided with grooves which receive corresponding ones of the bus bars and the insulators are clamped in a stacked relation sandwiching the bus bars.

In one embodiment of the invention the housing includes a coolant inlet and the grooves extend along the length of the insulators. The grooves further are open to the interior of the housing along substantially their entire length so that the bus bars within the grooves are directly exposed to coolant along substantially their entire length to enhance the operating efficiency of the machine.

In a highly preferred embodiment, the central one or ones of insulators in the stack have generally parallel faces and the grooves therein are disposed in one face at an adjacent side. The central insulators further include a flange extending from the other of the faces oppositely of the groove and at the same side as the groove. The flange is receivable in the groove of an adjacent insulator to confine the bus therein.

In order to assure that the grooves are open along substantially their entire length for coolant access, the length of the flange is less than the depth of the grooves.

Other objects and advantages will become apparent from the following specification taken in connection with the accompanying drawings.

DESCRIPTION OF THE DRAWINGS

FIG. 4 is a fragmentary plan view of a partially assembled terminal block;

FIG. 5 is a fragmentary sectional view taken approximately along the line 5—5 in FIG. 4;

FIG. 6 is a view similar to FIG. 2 but with additional components removed; and

FIG. 7 is an enlarged sectional view of the terminal block.

DESCRIPTION OF THE PREFERRED EMBODIMENT

Figure 1:
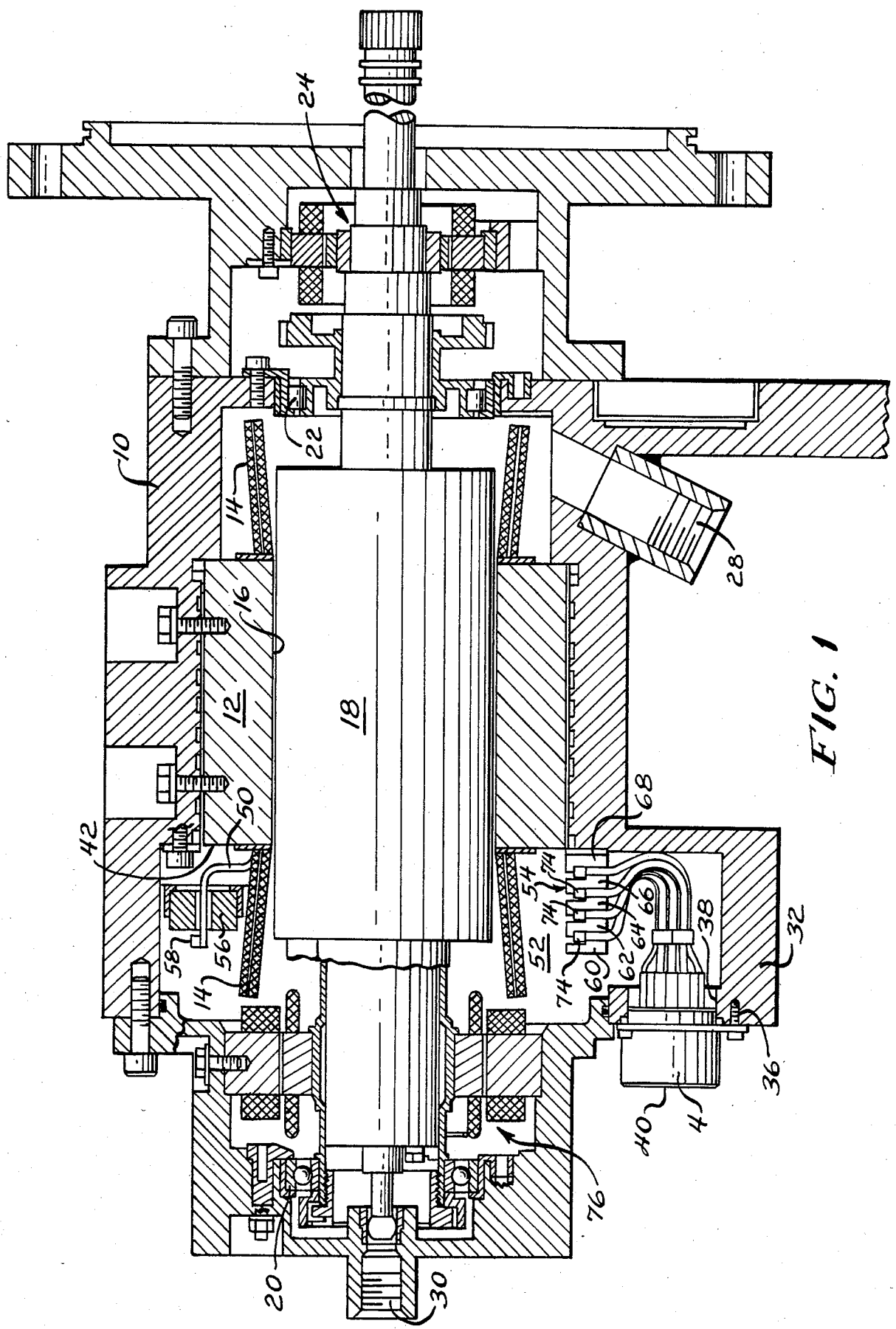
FIG. 1 is a sectional view of a dynamoelectric machine, specifically a three phase generator of the so-called brushless variety, made according to the invention.

An exemplary embodiment of a dynamoelectric machine made according to the invention in the form of a three phase, brushless generator is illustrated in FIG. 1 and with reference thereto is seen to include a housing 10. Within the housing 10 there is a body 12 of magnetizable material which serve as part of the stator of the machine. A plurality of solid wire windings of rectangular cross section are disposed in slots (not shown) in the body 12 and are visible in FIG. 1 as end turns 14.

The body 12 includes a central opening 16 in which a rotor 18 is disposed. The rotor 18 is journalled for rotation by bearings 20 and 22.

The rotor 18, at its righthand side as shown in FIG. 1, mounts components of a permanent magnet generator, generally designated 24 in a conventional fashion. Similarly, at its lefthand end, the rotor 18 mounts components of an exciter, generally designated 26. Other components of the permanent magnet generator 24 and the exciter 26 are stationarily mounted on the housing 10 as is well known and as is conventional in the art.

The housing includes a coolant outlet 28 and one or more coolant inlets including an inlet 30 by which a coolant, typically oil, may be introduced into the housing 10 and into the interior of the rotor 18 for cooling purposes.

Figure 2:
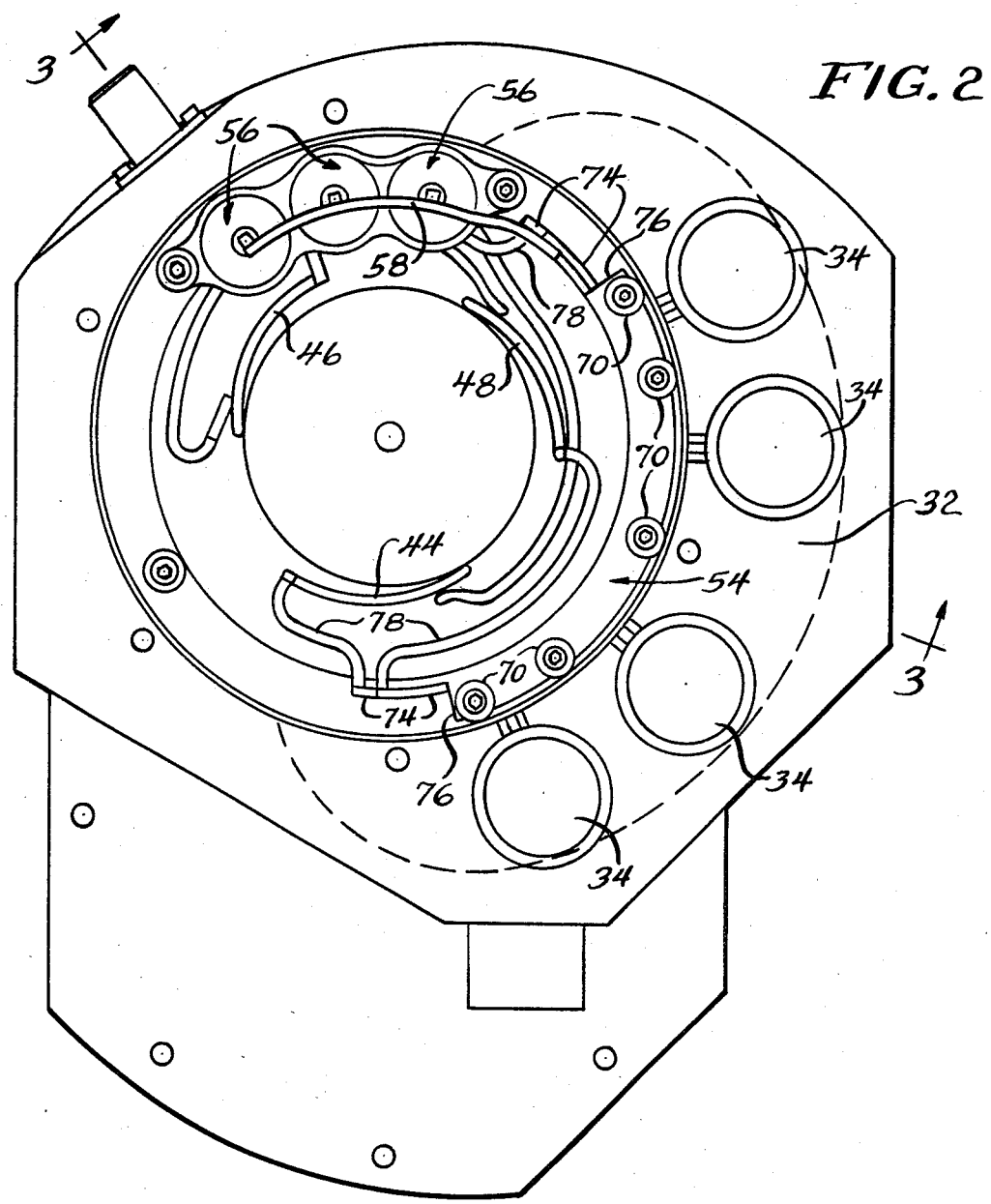
FIG. 2 is an end view of the machine with certain components removed to facilitate illustration.

As seen in FIGS. 1 and 2, radially outwardly of the rotor 18, the housing 10 includes a connector mounting section 32. Four female, multiple terminal connectors 34 of conventional construction are mounted as by screws 36 in bores 38 in the mounting section 32. In one embodiment, each connector 34 is adapted to make eleven external connections for a total of forty-four in all. As the connectors 34 are female connectors, they are adapted to receive a mating male connector (not shown) on their side 40 exterior of the housing 10.

As can be seen in one or both of FIGS. 1 and 2, at the lefthand end 42 of the stator body 12, four solid wires 44, 46, 48 and 50 emerge. For a three phase generator, three of such wires are associated with respective phase windings while the fourth represents neutral. In the annulus 52 within the housing 20 at the lefthand end 42 of the stator body 12 and radially outwardly of the end turns 14, there is disposed a terminal block, generally designated 54, made according to the invention as well as a series of current transformers, generally designated 56 (FIG. 2). The current transformers form part of a fault detection system as is well known and include suitable connections to a solid wire connector 58.

Figure 3:
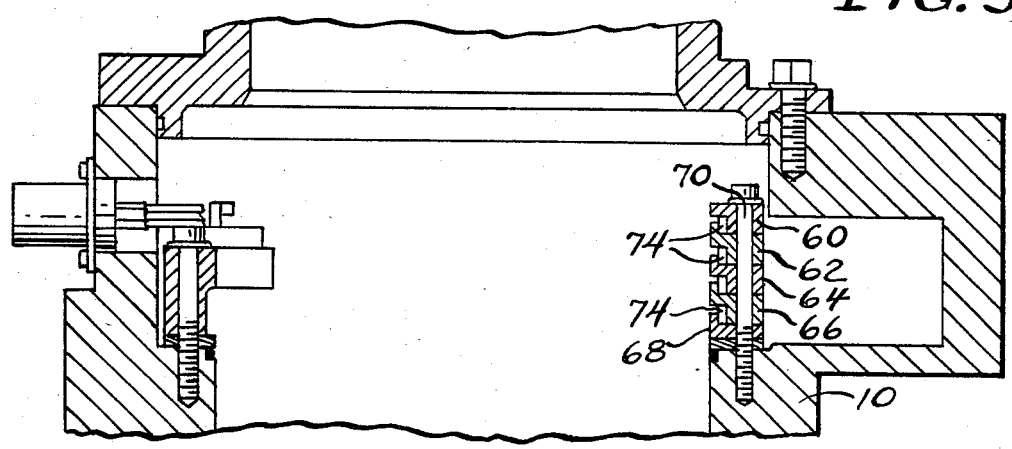
FIG. 3. is a sectional view taken approximately along the line 3—3 in FIG. 2.

As seen in FIG. 2, the terminal block 54 is elongated and arcuate about the rotational axis of the rotor 18. As seen in FIGS. 1 and 3, the same is made up of a stack of flat insulators 60, 62, 64, 66 and 68. The same are mounted and clamped in place by means of a series of bolts 70 (only one of which is shown in FIG. 3) which extend through aligned bores 72 in the insulators 60, 62, 64, 66 and 68 at the locations of the bolts 70 (FIG. 2) and bores 72 (FIG. 6) respectively bolts 70 are threaded into the housing 10. As seen in FIG. 1, elongated bus bars 74 are sandwiched between adjacent ones of the insulators 60, 62, 64, 66 and 68 there being one bus,bar 74 for each of the three phases and one for the neutral connection. As can be ascertained from FIGS. 2, 4 and 6, the bus bars 74 extend from at least one of the ends 76 of the terminal block 54 and by means of formed solid wire elements 78, are connected to a corresponding one of the windings or the neutral wires 44, 46, 48 and 50.

Referring now to FIGS. 3 and 7 it will be seen that each of the insulators 60, 62, 64 and 66 is provided with a groove 80 in which a corresponding bus bar 74 is sandwiched. The central one or ones of insulators 60, 62, 64 and 66 have flat, parallel faces 82 and 84 and the grooves 80 are formed in the faces 84 and ah adjacent side 86. The grooves 80 extend the length of the insulators 60, 62, 64 and 66 which is, of course, equal to the length of the terminal block 54 as shown in FIG. 2.

To retain the bus bars 74 in the respective grooves, each of the insulators 62, 64 and 66 (FIG. 7) and the insulator 68 (FIG. 3) are provided with a flange 88 on the face 82 and at the edge 86 which projects upwardly and into the groove 80 on the immediately adjacent insulator. It will be observed, however, that the length of each flange 88 is less than the depth of the groove 80 so that a portion 90 of each bus bar 74 is exposed to the interior of the housing 10.

As mentioned previously, coolant is introduced into the housing 10 and such coolant can then enter each groove 80 along its entire length between the side of the groove and the end of the flange 88 to make direct cooling contact therewith to increase efficiency of operation of the machine.

As seen in FIG. 4, within the terminal block 54, a plurality of stranded wires 92 are brazed as at 94 to each of the bus bars 74 and at locations radially aligned with the connectors 34 as can be seen from FIG. 6. These stranded wires are fed as located within FIG. 1 within the mounting section 32 of the housing 10 to the side of each connector 34 opposite the side 40, that is, the internal side and connected thereto by suitable means. As perhaps best seen in FIG. 4, the wires 92 emerge from the terminal block on the radially outer side thereof, that is, on the side 96 opposite the sides 86 of the insulators 60, 62, 64, 66 and 68. To allow the insulators 60, 62, 64, 66 and 68 to be abutted against one another, notches 100 as seen in FIG. 5 may be established in each of the insulators 62, 64, 66 and 68 appropriate locations through which the stranded wires 92 may emerge. Preferably, the notches or recesses 100 are sized so as to firmly, but not clampingly receive the wires 92.

In a preferred embodiment, at locations corresponding to each of the connectors 34, there will be three of the wires 92 extending from each of the buses 74 associated with the phase windings and two of the wires 92 connected to the bus bar 74 associated with neutral thereby providing 11 wires for connection to each of the connectors 34.

From the foregoing, it will be appreciated that a dynamoelectric machine with an internal terminal block made according to the invention eliminates the difficulties heretofore presented where a large number of external connections to exterior circuits are required. The unique configuration of the terminal block minimizes its size while providing sure electrical isolation of the various phases and neutral and a positive means of interconnecting solid wire conductors to stranded wire conductors. Furthermore, the construction of the terminal block is such as to provide for direct cooling contact of the bus bars with a coolant for the machine.

I claim:

1. In a multiple phase generator for generating a plurality of phases, the combination of
   a stator including a body of magnetizable material and a plurality of groups of windings associated therewith, each group defining one of said phases, each winding being of solid wire;
   a rotor mounted for rotation relative to said stator;
   a housing containing said rotor and said stator
   a plurality of multi-terminal connectors mounted on said housing and accessible from the exterior thereof;
   a terminal block within said housing and mounting a plurality of electrically isolated bus bars, one for each said phase;
   means connecting each of said bus bars to a corresponding one of said groups; and
   a plurality of stranded wire conductors interconnecting each of said bus bars and each of said multi-terminal connectors.

2. The multiple phase generator of claim 1 wherein said terminal block is defined by a stack of a plurality of insulators provided with grooves and in stacked relation, said bus bars being received in said grooves to be sandwiched by said insulators; and means clamping said insulators in said stacked relation.

3. The multiple phase generator of claim 2 wherein said said housing includes a coolant inlet and said insulators and said bus bars are elongated with said grooves extending along the length of said insulators and being open to the interior of the housing along substantially their entire length so that said bus bars are exposed to coolant along substantially their entire length.

4. The multiple phase generator of claim 2 wherein central one(s) of said insulators in the stack have generally parallel faces, and the groove in said one(s) insulators is in one face and an adjacent side thereof, and further including a flange extending from the other of said faces oppositely of said groove and at said adjacent side and receivable in the groove of the adjacent insulator to confine a bus bar therein.

5. The multiple phase generator of claim 4 wherein the length of said flange is less than the depth of said groove.

6. In a multiple phase generator for generating a plurality of phases, the combination of
 - a stator including a body of magnetizable material and a plurality of groups of windings associated therewith, each group defining one of said phases, each winding being of solid wire;
 - a rotor mounted for rotation relative to said stator;
 - a housing containing said rotor and said stator;
 - a plurality of multi-terminal connectors mounted on said housing and accessible from the exterior thereof;
 - an elongated terminal block within said housing comprised of a stack of elongated, flat insulators and mounting, between adjacent insulators, electrically isolated bus bars, one for each said phase;
 - said bus bars each protruding beyond one end of said terminal block;
 - means connecting each of said bus bars to a corresponding one of said groups at a location exterior of said terminal block; and
 - a plurality of stranded wire conductors within said housing interconnecting each of said bus bars and each of said multi-terminal connectors and extending between adjacent insulators at locations on a side of said terminal block.

7. The generator of claim 6 wherein said bus bars are received in elongated grooves at the interfaces of said insulators; and means confining said bus bars in said grooves while providing for direct cooling of said bus bars.

8. In a dynamoelectric machine, the combination of
 - a stator including a body of magnetizable material and a plurality of groups of windings associated therewith, each winding being of solid wire;
 - a rotor mounted for rotation relative to said stator;
 - a housing containing said rotor and said stator
 - a plurality of multi-terminal connectors mounted on said housing and accessible from the exterior thereof;
 - an elongated terminal block within said housing comprised of a stack of flat insulators and sandwiching electrically isolated bus bars between adjacent ones of said insulators;
 - means at at least one end of said terminal block connecting each of said bus bars to a corresponding one of said groups; and
 - a plurality of wire conductors extending from at least one side of said terminal block and interconnecting said bus bars and said multi-terminal connectors.

* * * * *